United States Patent
Ju et al.

(10) Patent No.: US 6,665,154 B2
(45) Date of Patent: Dec. 16, 2003

(54) SPIN VALVE HEAD WITH A CURRENT CHANNELING LAYER

(75) Inventors: Kochan Ju, Fremont, CA (US); You Feng Zheng, San Jose, CA (US); Rod Lee, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 191 days.

(21) Appl. No.: 09/931,155

(22) Filed: Aug. 17, 2001

(65) Prior Publication Data

US 2003/0035250 A1 Feb. 20, 2003

(51) Int. Cl.[7] .................................................. G11B 5/39
(52) U.S. Cl. ...................................................... 360/322
(58) Field of Search .............................. 360/322, 324.1, 360/324.11, 324.12, 324.2; 29/603.07, 603.13, 603.14, 603.15, 603.16, 603.18

(56) References Cited

U.S. PATENT DOCUMENTS

| | | | |
|---|---|---|---|
| 5,705,973 A | | 1/1998 | Yuan et al. .................. 338/32 R |
| 5,883,764 A | * | 3/1999 | Pinarbasi ...................... 360/322 |
| 5,920,446 A | | 7/1999 | Gill ............................. 360/113 |
| 6,040,962 A | * | 3/2000 | Kanazawa et al. ............ 360/322 |
| 6,134,089 A | | 10/2000 | Barr et al. .................... 360/322 |
| 6,201,669 B1 | | 3/2001 | Kakihara ...................... 360/313 |
| 6,208,492 B1 | | 3/2001 | Pinarbasi ................... 360/324.11 |
| 6,219,207 B1 | * | 4/2001 | Pinarbasi ...................... 360/322 |
| 6,226,158 B1 | * | 5/2001 | Pinarbasi ...................... 360/322 |
| 6,344,953 B1 | * | 2/2002 | Kautzky et al. ............... 360/322 |
| 6,359,760 B2 | * | 3/2002 | Kanno .......................... 360/322 |
| 6,493,194 B1 | * | 12/2002 | Sakaguchi et al. ............ 360/322 |
| 6,507,465 B1 | * | 1/2003 | Nakamoto et al. ............ 360/322 |

FOREIGN PATENT DOCUMENTS

JP        2000-99926       *  4/2000

OTHER PUBLICATIONS

S.H. Liao et al., "A Study on the Extendability of Spin Valve Heads for High Density Recording," 8 111 Joint MMM–Intermas Conf. Paper BB04, San Antonio, 2001.
K. Nakamoto et al., "Numerical Analysis of Spin–Valve Heads with Overlapping Leads," J. Magn. Soc. Jpn., vol. 21, No. 4–2, p. 261–264, (1997).

* cited by examiner

Primary Examiner—David L. Ometz
(74) Attorney, Agent, or Firm—George O. Saile; Stephen B. Ackerman

(57) ABSTRACT

Spin valve heads with overlaid leads have several advantages over butted contiguous junction designs, including larger signal output and better head stability. However, in any overlaid design there is always present at least one high resistance layer between the GMR layer and the conductive leads. This leads to an effective read width that is greater than the actual physical width. This problem has been overcome by inserting a highly conductive channeling layer between the GMR stack and the conducting lead laminate. This arrangement ensures that, at the intersection between the leads and the GMR stack, virtually all the current moves out of the free layer into the leads thereby providing an effective read width for the device that is very close to the physical read width defined by the spacing between the two leads. A process for manufacturing the device is also described.

21 Claims, 2 Drawing Sheets

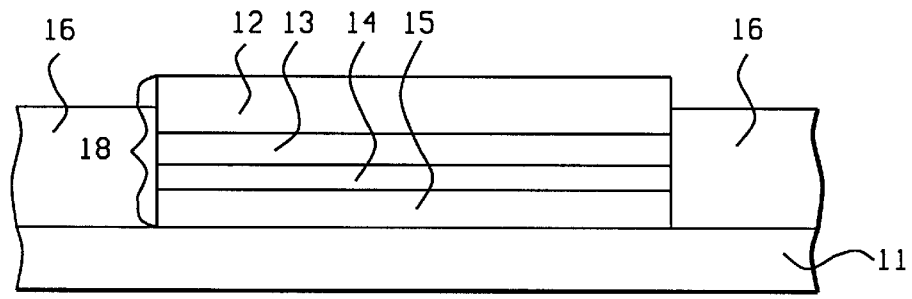
*FIG. 1 - Prior Art*
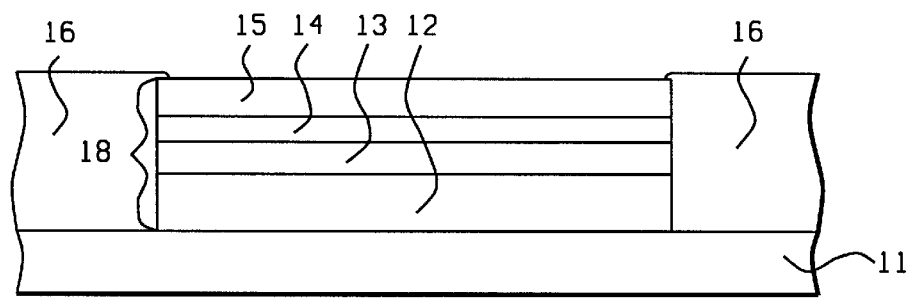
*FIG. 2 - Prior Art*
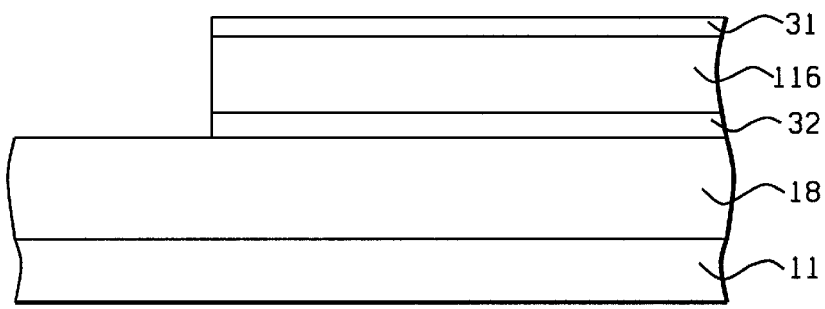
*FIG. 3 - Prior Art*

US 6,665,154 B2

SPIN VALVE HEAD WITH A CURRENT CHANNELING LAYER

FIELD OF THE INVENTION

The invention relates to the general field of magnetic recording disks with particular reference to read heads and leads that connect thereto.

BACKGROUND OF THE INVENTION

The present invention is concerned with the manufacture of the read element in a magnetic disk system. This is a thin slice of material, located between two magnetic shields, whose electrical resistivity changes on exposure to a magnetic field. Magneto-resistance can be significantly increased by means of a structure known as a spin valve (SV). The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are two magnetic layers separated by a non-magnetic layer. The thickness of the non-magnetic layer is chosen so that the magnetic layers are sufficiently far apart for exchange effects to be negligible but are close enough to be within the mean free path of conduction elections in the material. If the two magnetic layers are magnetized in opposite directions and a current is passed through them along the direction of magnetization, half the electrons in each layer will be subject to increased scattering while half will be unaffected (to a first approximation). Furthermore, only the unaffected electrons will have mean free paths long enough for them to have a high probability of crossing the non magnetic layer. Once these electrons have crossed the non-magnetic layer, they are immediately subject to increased scattering, thereby becoming unlikely to return to their original side, the overall result being a significant increase in the resistance of the entire structure.

In order to make use of the GMR effect, the direction of magnetization of one the layers must be permanently fixed, or pinned. Pinning is achieved by first magnetizing the layer (by depositing and/or annealing it in the presence of a magnetic field) and then permanently maintaining the magnetization by over coating with a layer of antiferromagnetic (AFM) material. The other layer, by contrast, is a "free layer" whose direction of magnetization can be readily changed by an external field (such as that associated with a bit at the surface of a magnetic disk). Structures in which the pinned layer is at the top are referred to as top spin valves.

An example of a top spin valve structure is show in FIG. 1 where layer 11 is a dielectric layer (acting as a substrate), layer 15 is the free layer, layer 14 is the non-magnetic layer, layer 13 is the pinned layer, and layer 12 is the pinning layer. Together, these four layers make up GMR stack 18.

FIG. 2 illustrates a bottom spin valve structure where, as can be seen, pinned layer 13 is at the bottom of the stack. Also seen in both FIGS. 1 and 2 are conductive leads 16 which make a butt contact to the sidewalls of stack 18. It should be noted that both FIGS. 1 and 2 are highly schematic and do not depict the actual detailed physical structure of a real unit. Such items as seed layers, glue layers, and longitudinal bias layers, for example, are not shown in these diagrams.

As track widths in magnetic recordings grow ever smaller, it has been found that, among the narrow track width magnetic readers, lead overlaid spin valve heads have several advantages over butted contiguous junction designs of the type illustrated in FIGS. 1 and 2. These advantages include larger signal output and better head stability [1–2].

However, in any overlaid design there is always present at least one high resistance layer between the GMR layer and the conductive leads. In particular, both top and bottom spin valve designs always include high resistivity lead stabilization layers above and, particularly, below the lead material. This is illustrated in FIG. 3 where conductive lead 116 (preferably gold, because of its low tendency to be subject to electro-migration, but other materials such as copper or ruthenium are also possible) has stabilization layers 31 and 32 at its top and bottom surfaces respectively. Tantalum is preferred for layers 31 and 32.

In the case of a top spin valve design, in addition to layer 31, the high resistivity antiferromagnetic layer 12 (see FIG. 1) also comes between the conductive lead and the active layers of the GMR stack. The presence of these intervening high resistance layers results in significant magnetic read width broadening which limits the effectiveness of this design for narrow track width applications.

The present invention provides a solution to this problem. The two publications referenced above are:

[1] S. H. Liao, Cheng Horng, Ben Hu, Y. Zheng, Min Li, and Kochan Ju, 8 111 Joint MMM-Intermag Conf. Paper BB04, San Antonio, 2001.

[2] K. Nakamoto et al, J. Magn. Soc. Jpn., 21,261(1997).

A routine search of the prior art was also performed with the following patent references of interest being found:

In U.S. Pat. No. 6,208,492, Pinarbasi shows a top SV, but the lead is on an AFM. In U.S. Pat. No. 6,201,669, Kakihara discloses a SV with a lead on the GMR. Yuan et al. (U.S. Pat. No. 5,705,973), Barr et al. (U.S. Pat. No. 6,134,089), and Grill (U.S. Pat. No. 5,920,446) are all related patents.

SUMMARY OF THE INVENTION

It has been an object of at least one embodiment of the present invention to provide a GMR based magnetic read head.

Another object of at least one embodiment of the present invention has been that said read head have conductive leads of the overlaid type.

Still another object of at least one embodiment of the present invention has been to provide a process for the manufacture of said read head.

A further object of at least one embodiment of the present invention has been that said read head be largely free of read width broadening.

A still further object of at least one embodiment of the present invention has been that said read head have operating characteristics at least as good as comparable structures of the prior art.

These objects have been achieved by inserting a highly conductive channeling layer between the GMR stack and the conducting lead laminate. This arrangement ensures that, at the intersection between the leads and the GMR stack, virtually all the current moves out of the free layer. This means that the effective read width of the device is very close to the physical read width that is defined by the spacing between the two leads. A process for manufacturing the device is also described.

BRIEF DESCRIPTION OF THE DRAWINGS

FIGS. 1 and 2 illustrate top and bottom spin valve structures, respectively, to which contact is made using butted leads.

FIG. 3 illustrates a spin valve structure of the prior art in which contact to the GMR if made through overlaid leads.

DESCRIPTION OF THE PREFERRED EMBODIMENTS

In the course of investigating the problem of magnetic read width broadening in overlaid lead structures where high resistance layers are present between the leads and the free layer, it was determined that not all the signal current from the Free layer was immediately concentrating in the conductive leads at the plane where the leads begin. Instead, shunting was occurring well after the track edge, causing the read head to act as though it was wider than the distance set by the separation between the leads.

In the present invention it is disclosed that this shunting effect can be almost entirely eliminated by inserting a thin, highly conductive, layer, which we shall refer to as a channeling layer, between the GMR stack and the lead. With the presence of a channeling layer that is only a few tens of Angstrom thick, the current distribution becomes much sharper than in the absence of such a channeling layer. This results in a significant reduction in the operational magnetic track width of the device.

Figure 4:
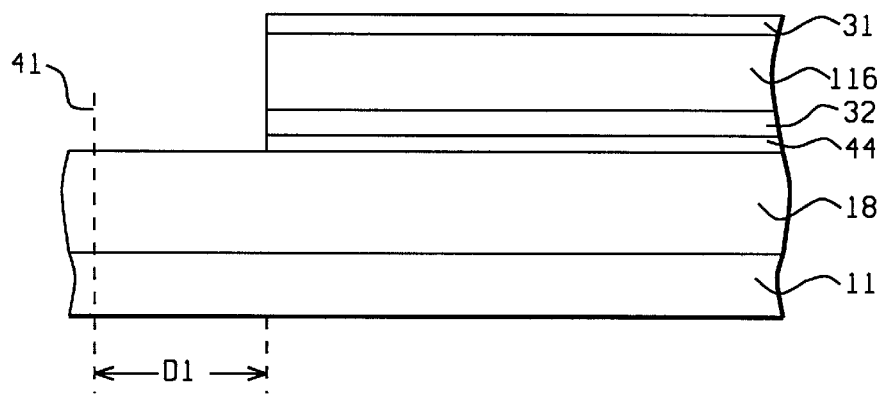
FIG. 4 shows the structure of the present invention.

We now describe a process for manufacturing the structure of the present invention. In the course of doing so the structure of the invention will also become apparent. Referring now to FIG. 4, the process of the present invention (for a bottom spin valve structure) begins with the provision of a suitable substrate such as layer 11 of aluminum oxide on which is deposited in succession, a pinning layer, a pinned layer, a non-magnetic layer, and a free layer, (FIG. 2 may be revisited to view the layers) thereby forming GMR stack 18. A photoresist pattern is then formed to define the desired track width and IBE (ion beam etching) is used to clean any exposed GMR stack surface.

Now follows a key feature of the invention, namely the deposition of channeling layer 44 on GMR stack 18, more specifically on the top surface of the pinning layer (which can be seen as layer 12 in FIG. 1). It is a critical requirement of the invention that the conductance of the channeling layer be in the range of between 1 and 3 times the conductance of the free layer.

In a typical unit, the conductance of the GMR stack would be about 0.03 to 0.1 mho. So for a value of 0.05 mho the conductance of the channeling layer would have to be between about 0.05 and 0.15 mho. This is readily accomplished by a layer of gold between about 20 and 100 Angstroms thick, but other metals such as copper, ruthenium, or rhodium could also have been used with appropriate thickness adjustments for resistivity.

Once the channeling layer is in place, standard processing may be resumed with the deposition of lead stabilization layers 32 and 31, with conductive lead layer 116 being deposited between them and an aluminum oxide capping layer. The device is completed by using a photoresist liftoff procedure to define the width of the read gap. Note that only the right hand half of the device is illustrated in FIG. 4. The middle of the GMR is marked by line 41 so the width of the read head is 2×D1, where D1 is the distance from the center of the GMR to the lead (i.e. the track's edge).

Manufacture of a top spin valve, according to the present invention, is the same as for the bottom spin valve, as just described, except that the sub-layers of the GMR stack are deposited in reverse order.

Note that our preferred method for depositing the channeling layer has been through sputtering, immediately following formation of the GMR stack performed during a single pumpdown. However, other deposition processes such as stitching gold or copper to the GMR could be substituted without departing from the spirit of the invention.

Results

Figure 5:
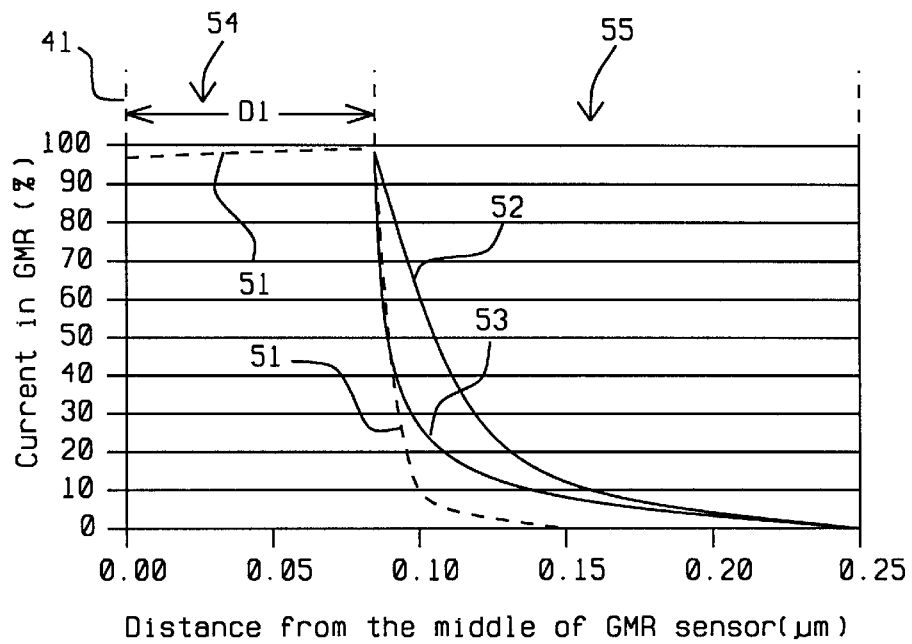
FIG. 5 is a plot of % current flowing through the GMR as a function of distance from the center of the GMR, comparing prior art and the present invention with the ideal case.

The effectiveness of the present invention was confirmed through finite-element calculation of the current distribution in a structure of the type illustrated in FIG. 4. This was then compared with distributions in a prior art structure (such as that seen in FIG. 3) and in an ideal structure in which the conducting lead was in direct contact with the GMR (i.e. no intervening pinning or stabilization layers). The results are shown in FIG. 5 as plots of percentage of current flowing through the GMR (as opposed to the leads) as a function of distance from the center of the read gap.

As in FIG. 4, D1 is the distance between the GMR center and the edge of the conductive lead. In this example, D1 was 0.085 microns and the GMR stack formed a bottom spin valve. The region marked as 54 is the part of the structure where there is no conductive lead over the GMR (i.e. the read head itself while region 55 is the region under and including the (right hand) lead. Curve 51 is for the ideal case (lead in direct contact with the GMR), curve 52 is for a structure of the prior art, and curve 53 is for the structure of the present invention (gold channeling layer 50 Å thick).

As can be seen, curve 53 comes significantly closer to the ideal case than does prior art curve 52. To quantify the effect of interface resistance on track width broadening, we define $\lambda$ as the position where the normalized current density in the GMR stack drops from 1 to 1/e. For the head with the channeling layer $\lambda$=0.01 microns, which is very close to the ideal case ($\lambda$=0.007 microns), whereas for a prior art structure $\lambda$=0.036 microns. This data confirms the effectiveness the channeling layer that has been disclosed as part of the present invention.

We note here that, other than reducing the effective read width of the device, the addition of the channeling layer had no effect on any of the performance characteristics of the device.

What is claimed is:

1. A bottom spin valve GMR read head, comprising:
   on a dielectric layer, a GMR stack that further comprises a free layer on a non-magnetic layer on a pinned layer on a pinning layer, said free layer having an electrical conductance;
   on said free layer, a channeling layer whose conductance is between 1 and 3 times the conductance of the free layer;
   on the channeling layer, a first lead stabilization layer;
   on said first lead stabilization layer, a conductive lead layer;
   on the conductive lead layer, a second lead stabilization layer; and
   said first and second lead stabilization layers and said conductive lead layers having the form of a GMR read head located between opposing conductive leads.

2. The read head described in claim 1 wherein the channeling layer is selected from the group consisting of gold, copper, ruthenium, and rhodium.

3. The read head described in claim 1 wherein the channeling layer has a thickness between about 20 and 100 Angstroms.

4. The read head described in claim 1 wherein the lead stabilization layers are tantalum.

5. A top spin valve GMR read head, comprising:

on a dielectric layer, a GMR stack that further comprises a pinning layer on a pinned layer on a non-magnetic layer on a free layer, said free layer having an electrical conductance;

on said pinning layer, a channeling layer whose conductance is between 1 and 3 times the conductance of the free layer;

on the channeling layer, a first lead stabilization layer;

on said first lead stabilization layer, a conductive lead layer;

on the conductive lead layer, a second lead stabilization layer; and said first and second lead stabilization layers and said conductive lead layers having the form of a GMR read head located between opposing conductive leads.

6. The read head described in claim 5 wherein the channeling layer is selected from the group consisting of gold, copper, ruthenium, and rhodium.

7. The read head described in claim 5 wherein the channeling layer has a thickness between about 20 and 100 Angstroms.

8. The read head described in claim 5 wherein the conductance of the GMR stack is between about 0.03 and 0.1 mho.

9. The read head described in claim 5 wherein the lead stabilization layers are tantalum.

10. A process for manufacturing a bottom spin valve, comprising:

on a dielectric layer, depositing a GMR stack that further comprises a free layer on a non-magnetic layer on a pinned layer on a pinning layer, said free layer having an electrical conductance;

on said free layer, depositing a channeling layer whose conductance is between 1 and 3 times the conductance of the free layer;

on the channeling layer, depositing a first lead stabilization layer;

on said first lead stabilization layer, depositing a conductive lead layer;

on the conductive lead layer, depositing a second lead stabilization layer; and patterning said channeling layer, said first and second lead stabilization layers and said conductive lead layers to form a GMR read head located between opposing conductive leads.

11. The process described in claim 10 wherein the channeling layer is selected from the group consisting of gold, copper, ruthenium, and rhodium.

12. The process described in claim 10 wherein the channeling layer is deposited to a thickness between about 20 and 100 Angstroms.

13. The process described in claim 10 wherein the step of depositing said channeling layer further comprises use of sputtering.

14. The process described in claim 10 wherein the conductive lead layer is gold.

15. The process described in claim 10 wherein the conductive lead layer is deposited to a thickness between about 150 and 700 Angstroms.

16. A process for manufacturing a top spin valve, comprising:

on a dielectric layer, depositing a GMR stack that further comprises a pinning layer on a pinned layer on a non-magnetic layer on a free layer, said free layer having an electrical conductance;

on said pinning layer, depositing a channeling layer whose conductance is between 1 and 3 times the conductance of the free layer stack;

on the channeling layer, depositing a first lead stabilization layer;

on said first lead stabilization layer, depositing a conductive lead layer;

on the conductive lead layer, depositing a second lead stabilization layer; and patterning said channeling layer, said first and second lead stabilization layers and said conductive lead layers to form a GMR read head located between opposing conductive leads.

17. The process described in claim 16 wherein the channeling layer is selected from the group consisting of gold, copper, ruthenium, and rhodium.

18. The process described in claim 16 wherein the channeling layer is deposited to a thickness between about 20 and 100 Angstroms.

19. The process described in claim 16 wherein the step of depositing said channeling layer further comprises use of sputtering.

20. The process described in claim 16 wherein the conductive lead layer is gold.

21. The process described in claim 16 wherein the conductive lead layer is deposited to a thickness between about 150 and 700 Angstroms.

* * * * *